No. 779,270. PATENTED JAN. 3, 1905.
R. EYRES.
COAT HANGER.
APPLICATION FILED MAR. 25, 1904.
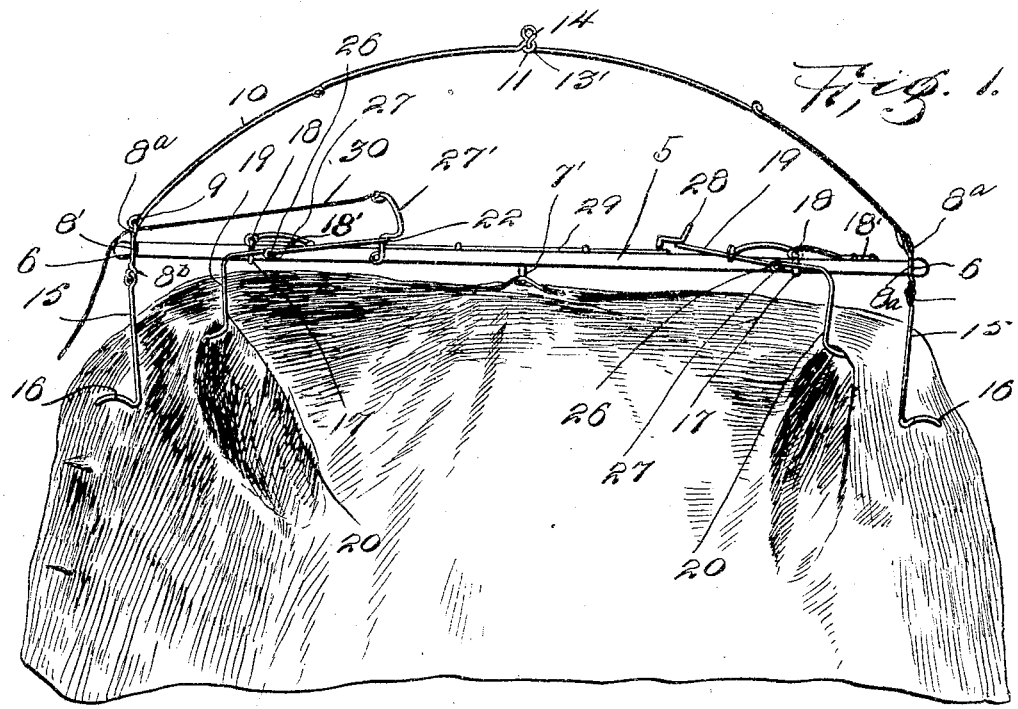
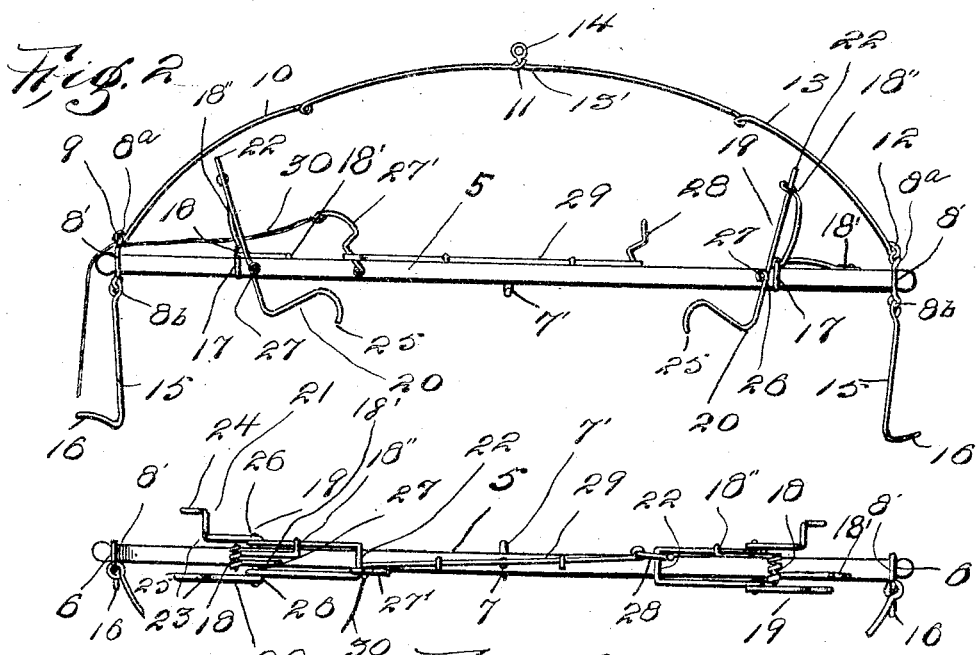
Witnesses
Inventor
Robt. Eyres
Attorneys No. 779,270. Patented January 3, 1905.

UNITED STATES PATENT OFFICE.

ROBERT EYRES, OF AURORA, NEBRASKA.

COAT-HANGER.

SPECIFICATION forming part of Letters Patent No. 779,270, dated January 3, 1905.

Application filed March 25, 1904. Serial No. 200,002.

*To all whom it may concern:*

Be it known that I, ROBERT EYRES, a citizen of the United States, residing at Aurora, in the county of Hamilton, State of Nebraska, have invented certain new and useful Improvements in Coat-Hangers; and I do hereby declare the following to be a full, clear, and exact description of the invention, such as will enable others skilled in the art to which it appertains to make and use the same.

This invention relates to coat-hangers, and has for its object to provide a device of this nature which may be folded into compact form for shipment and which will hold an overcoat or similar garment in such a way that one may readily insert his arms into the sleeve-openings to put on the coat.

A further object is to provide a coat-hanger in which, after the coat has been put on, the hooks which support the coat may be readily disengaged therefrom.

In the drawings forming a portion of this specification, and in which like numerals of reference indicate similar parts in the several views, Figure 1 is a view of the preferred form of the invention with a coat engaged therewith. Fig. 2 is a view of the device with the coat removed. Fig. 3 is a plan view with certain hooks broken away.

Referring now to the drawings, the present invention comprises a bar 5, having grooves 6 at its ends and a perforation 7 at its center. A pair of clips are provided, each of which consists of a central loop 8', having supplemental end loops 8ª and 8ᵇ, the loop 8ᵇ being split at a point adjacent to its union with the loop 8' and being turned at right angles to the other loops. One of these clips is disposed upon each end of the bar with the loop 8' lying in the grooves 6. Engaged with one of the loops, 8ª, is a hook 9, carried by a rod 10, the other end of the rod being formed into a ring 11, which lies at right angles to the hook 9, as shown. The remaining loop has engaged therewith the hook 12 of a similar rod 13, the remaining end of which has a loop 14. The rod 13 has a convolution 13' adjacent to the loop 14, and with this convolution is engaged the ring 11 of the rod 10. With the loops 8ᵇ are engaged the upper hooked ends of rods 15, which have their free ends curved outwardly at right angles to form hooks 16.

Upon the bar 5, inwardly of the ends thereof, are disposed clips 17, with the upper portions of which are engaged helical springs 18, for a purpose which will be hereinafter mentioned.

Hooks 19 are provided, each of which consists of a pair of spaced members 20 and 21, connected by a bight 22, the free ends of the spaced members being turned at right angles, as shown at 23. The portion of the member 21 beyond the angular portion 23 is curved outwardly, as shown at 24, while the similar portion of the member 20 is turned at right angles, as shown at 25. Between the bight 22 and angular portion 23 the members 20 and 21 are provided with loops 26. These hooks 19 are disposed upon the bar 5 with the members 20 and 21 at opposite sides thereof, with the bight 22 above the bar, and the loops 26 are engaged with pivot-pins 27.

One of the ends of each helical spring 18 is secured to the bar 5, as shown at 18', and the remaining end 18" is slidably engaged with one of the members 20 and 21 of the hooks 19. The action of the helical springs, as will readily be seen, is to hold the upper portions of the hooks 19 vertical and the angular portion 23 parallel with the bar 5, as shown in Fig. 2.

A pair of triggers 27' and 28 are pivoted to the bar 5 and are disposed for engagement over the bights 22 of the hooks 19 to hold these hooks against the action of the springs 18, and these triggers are connected by a rod 29. The triggers are disposed for movement in the same direction to release the hooks 19, and connected with the trigger 27' is a cord 30, which passes through the loop 8ª of the adjacent clip 8 and which may be pulled to disengage the triggers and release the hooks 19.

The central perforation 7, mentioned above, has engaged therewith the shank of a hook 7', as shown.

In Fig. 1 the loop 14 is engaged with a slidable hook to support the device and the ends 24 and 25 of the hooks 19 are engaged with the sleeve-openings of a coat, the hook 7' being engaged beneath the collar while the ends 16 of the rods 15 are engaged with the lapels of the coat to hold them in the desired position, it being observed in Fig. 1 that when the coat is thus engaged with the device the bights 22 of the hooks 19 are engaged beneath the triggers 27' and 28. With the coat in the position just described the garment may be readily put on, and when this has been done a jerk upon the cord 30 disengages the triggers 27' and 28 from the hooks 19 and the helical springs 18, causing the hooks to move pivotally upon the pins 27, the ends of the members are disengaged from the sleeve-openings of the coat.

In folding the hanger for shipment the hook 9 is disengaged from the loop 8$^a$ and the rod 10 is folded to lie against the rod 5. The rods 15 being loosely connected with the bar 15 through the medium of the loops 8$^b$ may also be folded to lie against the bar 5.

What is claimed is—

1. A coat-hanger comprising a bar, having a supporting-loop, hooks pivotally connected with the bar and adapted for engagement of their bills with the sleeve-openings of a garment, means for holding the hooks yieldably out of position to engage the sleeve-openings of a garment, and means for holding the hooks against the action of the first-named holding means.

2. A coat-hanger comprising a bar, means for supporting the bar, hooks pivoted to the bar and adapted for engagement with the sleeve-openings of a garment, said hooks being movable into position to engage the sleeve-openings of a garment, means for holding the hooks yieldably out of such position, triggers pivoted to the bar and adapted for engagement with the hooks to hold them against the action of the first-named holding means, and means for disengaging the triggers from the hooks.

3. A coat-hanger comprising a bar, having a supporting-loop, hooks pivoted to the bar and movable into and out of position to engage the sleeve-openings of a garment, means for holding the hooks in operative position, means for disengaging the holding means, and means for moving the hooks out of operative position when the holding means is disengaged.

In testimony whereof I affix my signature in presence of two witnesses.

ROBERT EYRES.

Witnesses:
J. W. MARVEL,
J. H. EDMONDSON.